Sept. 8, 1959     O. C. GESSLER     2,902,710
COMPOSITE VEHICLE CLOSURE HINGE BRACKET
Filed Jan. 22, 1958
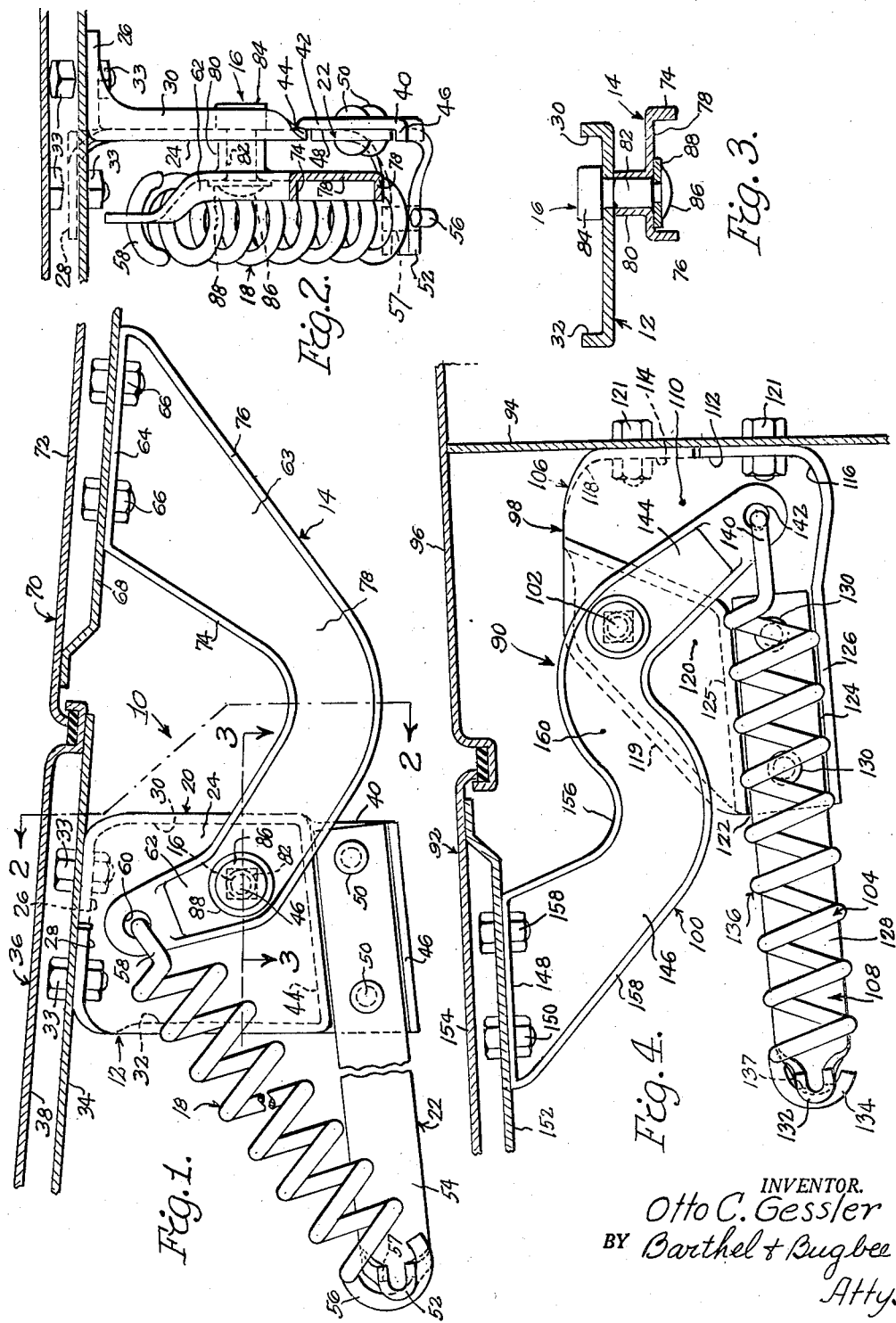
INVENTOR.
Otto C. Gessler
BY Barthel & Bugbee
Attys United States Patent Office 2,902,710
Patented Sept. 8, 1959

2,902,710
COMPOSITE VEHICLE CLOSURE HINGE BRACKET

Otto C. Gessler, Detroit, Mich.

Application January 22, 1958, Serial No. 710,440

7 Claims. (Cl. 16—190)

This invention relates to closure hinges and, in particular, to vehicle body closure hinges.

One object of this invention is to provide a vehicle body closure hinge composed of easily and inexpensively produced sheet metal stampings and adaptable either to the hinged mounting of the rear deck lid or of the engine compartment hood.

Another object is to provide a vehicle body closure hinge of the foregoing character wherein the hinge bracket which is secured to the vehicle body is composed of two stampings which are capable of being manufactured at low cost and fitted together to provide a spring anchorage and hinge lever mounting respectively.

Another object is to provide a vehicle body closure hinge of the foregoing character wherein the hinge mounting bracket is grooved and the spring anchorage consists of a bar shaped to fit snugly into the groove so as to accurately position it as well as to enable the assembly of the parts by inexperienced workmen without the possibility of misaligning the parts.

Another object is to provide a composite vehicle body closure hinge of the foregoing character as set forth in the object immediately preceding, wherein the grooved portion of the hinge mounting bracket is so formed as to enhance the strength of construction by reason of its channel-shaped configuration.

Other objects and advantages of the invention will become apparent during the course of the following description of the accompanying drawings, wherein:

Figure 1 is a side elevation of a vehicle body closure hinge, according to one form of the invention, mounted on and depending from the rear deck of an automobile body for hingedly supporting the deck lid thereof;

Figure 2 is a vertical cross-section, mainly in front elevation, of the hinge installation shown in Figure 1;

Figure 3 is a horizontal section through the hinge arm pivot mounting taken along the line 3—3 in Figure 1; and Figure 4 is a side elevation, similar to Figure 1, but showing a modification of the invention for hingedly supporting the engine compartment hood from the fire wall or bulkhead thereof.

Referring to the drawings in detail, Figures 1 and 2 show a composite vehicle body closure hinge, generally designated 10, according to one form of the invention as consisting generally of a composite closure hinge mounting bracket structure 12 and a hinge lever 14 pivotally mounted intermediate its ends upon a pivot pin 16, on the mounting structure 12, and yieldingly urged into a weight-counterbalancing position by a helical spring 18 connected to one end thereof. The composite mounting bracket structure 12 consists of two parts, namely the mounting bracket 20 and the spring anchorage bar 22 secured thereto in a manner described in more detail below.

The mounting bracket 20 is stamped from flat sheet metal into the shape illustrated in Figures 1 and 2 in a conventional stamping press by means of dies which are beyond the scope of the present invention. It consists of a main flat plate 24 having oppositely-directed flat mounting feet 26 and 28 disposed at right angles thereto and strengthened by interconnecting edge angle flanges 30 and 32 respectively extending along the opposite side edges of the main plate 24 and continuing along the outer edges of the feet 26 and 28. The feet 26 and 28 are adapted to be secured as by bolts 33 to the inclined inner panel 34 of the vehicle body rear deck 36 having an outer panel 38. In order to maintain the main plate 24 in a vertical position (Figure 1), the feet 26 and 28 are disposed at an angle inclined slightly to the vertical, as seen in Figure 1. In Figure 2, the inner foot 28 is shown in dotted lines since it is largely concealed by the upwardly-inclined inner panel 34 at the section plane 2—2.

The mounting bracket 20 at its lower end is provided with a channel portion 40 inclined slightly relatively to the horizontal, and provided with an offset bottom wall 42 and parallel upper and lower side walls 44 and 46 (Figure 2) defining a correspondingly inclined groove 48 into which the spring anchorage bar 22 snugly fits and is secured therein by fasteners 50, such as rivets. In the hinge 10, the bar 22 is inclined downwardly and forwardly of the vehicle body away from the hinge lever 14 and is provided with a spring anchorage projection 52 of U-shaped cross-section integral with and projecting laterally inward from the main bar portion 54 of the spring anchorage bar 22 at approximately right angles thereto. The forward end portion 56 of the spring 18 is hooked around the projection 52 and fits into a notch 57 therein (Figure 2), whereas its rearward end 58 is hooked through a hole 60 in the upwardly-inclined inner arm 62 of the hinge lever 14.

The outer arm 63 of the hinge lever 14 is provided with a mounting flange 64 which is secured by bolts or other fasteners 66 to the inner panel 68 of the rear deck or trunk compartment lid 70, the panel 68 being secured to the outer panel 72 thereof. The opposite edges of the hinge lever 14 are given increased rigidity by opposite edge flanges 74 and 76 bent substantially at right angles to the main body 78 of the hinge lever 14. Adjacent the pivot pin 46 (Figure 3), the hinge lever 14 is provided with an integral tubular bearing projection 80 through which the shank 82 of the pivot pin 46 projects, the outer end thereof having a head 84 and the inner end being enlarged by an upsetting operation as at 86 with a washer 88 located between it and the main portion 78 of the hinge lever 14.

In the operation of the hinge 10, the latter when mounted in the manner shown in Figures 1 and 2 and described above with the closure or lid 70 in its closed position, places the hinge lever 14 in such a position as to stretch the spring 18 so that it is placed under tension and consequently imparts a counterbalancing force to the hinge lever 14 in order to balance or slightly overbalance the weight of the closure 70. It will be understood, of course, that a typical installation includes two of the hinges 10 at opposite sides of the rear trunk compartment, both hinges 10 cooperating to permit raising and lowering of the lid 70 relatively to the rear deck 36 in order to open and close the rear or trunk compartment respectively. When the lid 70 is raised, the arm 78 of each hinge lever 14 swings upward, causing the arm 62 thereof to swing downward around its pivot pin 46, relaxing the spring 18 and causing it to hold the lid 70 in its raised or open position.

In its closed position, the lid 70 is of course provided with a conventional latch or lock in order to prevent the accidental opening of the lid by the springs 18 of the two hinges 10.

The modified closure hinge, generally designated 90, shown in Figure 4 is of similar construction to that shown in Figures 1 and 2 except that it is adapted to hingedly support the hood 92 over the engine compartment of the automobile and to permit it to be swung upward or downward relatively to the fire wall or bulkhead 94 into closing relationship with the cowl 96. As before, the hinge 90, of which there are two mounted on opposite sides of the vehicle body, consists of a composite hinge mounting bracket structure 98 and a hinge lever 100 pivotally mounted intermediate its ends upon a pivot pin 102 upon the mounting bracket structure 98, and yieldingly urged into a weight counterbalancing position by a helical spring 104 connected to one end thereof.

As before, the composite mounting bracket structure 98 consists of a mounting bracket 106 and a spring anchorage bar 108 secured thereto. The mounting bracket 106 has a main flat plate 110 with oppositely-directed flat mounting feet 112 and 114 disposed at right angles thereto and strengthened by edge angle flanges 116 and 118 respectively extending along the opposite side edges of the main plate 110 and continuing along the outer edges of the feet 112 and 114 similarly to the construction shown in Figure 2. An edge flange 119 additionally strengthens the flat portion 120 of the bracket 106 which is offset relatively to the flat plate 110 thereof. The feet 112 and 114 are adapted to be secured as by the bolts 121 to the bulkhead 94.

The mounting bracket 106 is provided at its lower rearward end portion with a laterally-offset integral channel bottom wall 122 of a channel or groove 124 inclined slightly relatively to the horizontal and provided with upper and lower side walls 125 and 126. The spring anchorage bar 108 has a flat main bar portion 128 which is fitted snugly into the channel or groove 124 and is secured therein as by rivets or other fasteners 130. The forward end of the spring anchorage bar 108 is provided with a spring anchorage projection 132 of U-shaped cross-section integral with and projecting laterally from the main bar portion 128 substantially at right angles thereto. The forward end portion 134 of the counterbalancing spring 136 is hooked around the projection 132 into a notch 137 therein, whereas its rearward end 140 is hooked through a hole 142 in the downwardly and rearwardly-inclined inner arm 144 of the hinge lever 100. The outer arm 146 of the hinge lever 100 is provided with a mounting flange 148 which is secured by bolts or other fasteners 150 to the inner panel 152 of the hood 92, the outer panel 154 of which engages the cowl 96. The opposite edges of the hinge lever 100 are provided with strengthening flanges 156 and 158 respectively and the main flat portion 160 of the hinge lever 100 is similarly provided with an integral tubular bearing projection (not shown) similar to that shown in Figure 3 at 80 and similarly providing bearing support for the pivot pin 102.

In the operation of the modified hinge 90, the hood 92 in its closed position places the hinge levers 100 in such locations as to stretch the springs 104 to place them under tension and slightly overbalance the weight of the hood 92 in such a manner that it swings upward slightly after its conventional lock or latch (not shown) is released. It is of course assumed, as stated above, that a typical installation includes two of the hinges 90. When the lid 92 is raised completely for the purpose of inspecting the engine, it is of course held in its raised position by a rod (not shown) or other conventional means of holding the hood 92 without depending upon the springs 104. When the hood 92 and the hinge levers 100 are swung downward to close the engine compartment, the arms 144 of the hinge levers 100 swing rearwardly to again tension the springs 104, as shown in Figure 4.

What I claim is:

1. A vehicle closure hinge lever bracket, comprising an elongated sheet metal plate having at one end a pair of oppositely-bent attachment feet disposed substantially at right angles thereto and having near its other end a channel and having intermediate said ends a hinge lever pivot pin mounting; an elongated spring anchorage bar disposed at one end in said channel and having at its opposite end a spring anchorage; and means for securing said bar in said channel.

2. A vehicle closure hinge lever bracket, according to claim 1, wherein the bottom wall of said channel is offset substantially the thickness of said bar whereby to place said bar substantially in the same plane as said plate and substantially flush therewith.

3. A vehicle closure hinge lever bracket, according to claim 1, wherein said spring anchorage consists of a projection integral with said bar and disposed substantially at right angles thereto.

4. A vehicle closure hinge lever bracket, according to claim 1, wherein said channel is inclined at an acute angle relatively to said feet.

5. A vehicle closure hinge lever bracket, according to claim 1, wherein said plate and said feet have approximately L-shaped edge flanges extending therebetween.

6. A vehicle closure hinge lever bracket, according to claim 1, wherein said channel is disposed at one end of said plate and extends thereacross.

7. A vehicle closure hinge lever bracket, according to claim 1, wherein said channel is disposed transversely to said attachment feet of said plate and extends inwardly from said other end toward said attachment feet.

References Cited in the file of this patent

UNITED STATES PATENTS

| | | |
|---|---|---|
| 2,479,437 | Vigmostad et al. | Aug. 16, 1949 |
| 2,771,629 | Gessler | Nov. 27, 1956 |